United States Patent Office 3,584,018
Patented June 8, 1971

3,584,018
TERPENIC ACID ESTERS OF d-PANTOTHENOL
Silvano Casadio, Milan, Italy, assignor to Istituto de
Angeli S.p.A., Milan, Italy
No Drawing. Filed Feb. 13, 1967, Ser. No. 615,372
Claims priority, application Great Britain, Feb. 24, 1966,
8,243/66
Int. Cl. C09f 5/00, 7/00
U.S. Cl. 260—404        3 Claims

ABSTRACT OF THE DISCLOSURE

New esters of d-pantothenol possessing the property of promoting the healing of lesions. The compounds have the formula:

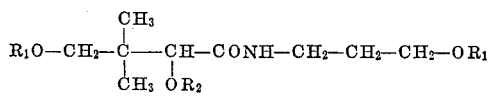

in which $R_1$ represents the radical of an acyclic or cyclic terpenic acid and $R_2$ represents a hydrogen atom or the radical of an acyclic or cyclic terpenic acid.

---

This invention relates to esters of d-pantothenol having valuable pharmacological properties.

According to the present invention, there are provided esters of d-panthothenol having the general formula:

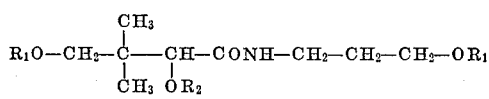
(I)

in which $R_1$ represents the radical of an acyclic or cyclic terpenic acid and $R_2$ represents a hydrogen atom or the radical of an acyclic or cyclic terpenic acid.

The compounds according to the invention generally possess the property of promoting the healing of lesions while having low irritant action when applied topically and also a low toxicity. The compounds according to the invention are particularly useful for the promotion of healing of skin lesions and wounds.

In the compounds of Formula I as hereinbefore defined, $R_1$ preferably represents the radical of an acyclic or cyclic mono-, sesqui- or diterpenic acid containing from 10 to 22 carbon atoms. Examples of said terpenic acids include geranic, homo-geranic, geranylacetic, cyclogeranic, citronellic, farnesic, homo-farnesic and farnesylacetic acids.

It will be appreciated that compounds of the Formula I can exist in the cis and trans forms and mixtures thereof, all of which are within the scope of the present invention.

The healing activity has been studied in guinea-pigs by determining the reduction of a wound (induced on the dorsal zone of the skin) after painting with the undiluted compound under examination for 10 days. The irritant action when applied topically has been studied in albino rabbits after local application of the compound on the intact skin, on the abraded skin, on the cornea and on the penis mucosa. One of the preferred compounds of the present invention, d-pantothenyl tri-farnesylacetate, hereinafter designated DA-1813, has given, in the healing activity tests, the following results:

| Treatment | Number of guinea pigs | Decrease of the lesion at the 6th day [1] | | Decrease of the lesion at the 10th day [1] | |
|---|---|---|---|---|---|
| | | $\overline{m} \pm s_m$ | P [2] | $\overline{m} \pm s_m$ | P |
| Control | 21 | 21.95±4.54 | | 64.80±8.47 | |
| DA-1813 | 21 | 27.33±5.37 | >0.05 | 94.23±3.28 | 0.001<P<0.01 |

[1] Expressed as a percentage based upon the area of the initial wound
[2] Probability calculation compared with the control group.

NOTE.—$\overline{m}$ represents the average percentage value and $s_m$ represents the deviation from the average value.

The tests to assess irritant action referred to above have shown that DA-1813 does not cause any significant irritation when applied topically. Moreover the compound has a low toxicity, the $LD_{50}$ i.p. in mice being between 800 and 1600 mg./kg. Furthermore, metabolism studies carried out on rats have shown that DA-1813 is not converted either into pantothenol or pantothenic acid after administration, thus indicating that its activity is to be ascribed to the compound per se.

According to a further feature of the present invention, there is provided a process for the preparation of compounds of Formula I as defined above which comprises reacting d-pantothenol with a reactive derivative of an acyclic or cyclic terepenic acid to effect esterification. Preferred reactive derivatives are halides and anhydrides of the terpenic acid. According to whether the diester ($R_2$=H) or the triester is to be obtained, 1 mole of pantothenol is desirably reacted with 2 or 3 moles respectively of the terpenic acid derivative.

It will be appreciated that in those compounds of Formula I, where $R_2$ is other than hydrogen, $R_1$ and $R_2$ may be the same or different. In the latter case the compounds may be prepared by reacting the diester ($R_2$=H) with a reactive derivative, e.g. halide or anhydride, of an appropriate terpenic acid.

In one particularly advantageous process according to the invention, compounds of Formula I are prepared by reacting d-pantothenol with the calculated quantity of the halide, preferably the chloride, of an appropriate terpenic acid at ambient or elevated temperature conveniently between 50° and 100° C., and under substantially anhydrous conditions. The reaction is preferably carried out in the presence of an acid binding agent and an inert organic solvent, the d-pantothenol not necessarily being soluble in the solvent. Acid binding agents which may with advantage be used include tertiary organic bases, such as for example pyridine, quinoline, dimethylaniline and trimethylamine. Suitable inert solvents include for example chloroform, carbon tetrachloride, ether and pyridine. Pyridine is thus an example of a compound which is able to serve both as acid binding agent and as solvent.

In an alternative process, d-pantothenol is reacted with the calculated amount of the anhydride of an appropriate terpenic acid at ambient or elevated temperature conveniently between 50° and 100° C., ad under substantially anhydrous conditions. The reaction is again conveniently effected in the presence of an inert solvent and a tertiary organic base as acid binding agent. A preferred solvent and tertiary organic base is pyridine; other solvents and tertiary organic bases which may conveniently be used are as listed above in connection with the reaction of d-pantothenol with a terpenic acid halide.

The impure products isolated from the reaction medium may advantageously be purified by chromatography, for instance on alumina. Petroleum ether is conveniently used as eluent for the triesters; for the diesters, a mixture of benzene and acetone (a previous elution with a mixture of petroleum ether and benzene having been used to remove impurities) is preferably used.

The compounds of Formula I according to the invention are in general viscous oils insoluble in water but soluble in most of the common organic solvents.

According to a still further feature of the present invention, pharmaceutical compositions for topical application are provided which comprise at least one compound of Formula I (as defined above) in association with a topical carrier therefor. Such compositions can for example conveniently take the form of creams, ointments, pomades, lotions, eye-drops, nasal drops and oily solutions containing from 0.1 to 10%, preferably from 0.5 to 5%, by weight of a compound of Formula I. The compositions may if desired contain further active ingredients such as for example antibacterial agents, glucocorticoids and vasoconstrictors.

Ointments and creams, may for example be formulated with an aqueous or oily base with the addition of suitable thickening and/or gelling agents. Such bases may thus, for example, include water and/or an oil such as liquid paraffin or a vegetable oil such as arachis oil or castor oil. Thickening agents which may be used include soft paraffin, aluminium stearate, cetostearyl alcohol, polyethylene glycols, woolfat, hydrogenated lanolin and bees wax.

Lotions may be formulated with an aqueous or oily base and may also comprise emulsifying agents, stabilizing agents, dispersing agents, suspending agents, thickening agents or colouring agents.

For internal administration the compounds according to the invention may for example be formulated for oral, parenteral and rectal administration. Such compounds comprising a compound of Formula I in association with a pharmaceutical carrier or excipient. The compositions are conveniently in the form of dosage units, such as tablets, capsules, pills, suppositories and vials containing injectable solutions. Each dosage unit preferably contains 0.010 to 0.250 g., advantageously 0.025 to 0.100 g., of active ingredient.

The following examples illustrate the invention:

EXAMPLE 1

67 ml. of anhydrous pyridine are added during 1 hour, with vigorous stirring, to a mixture of 50 g. (0.176 mol) of farnesylacetyl chloride (obtained from natural nerolidol according to P. Dietrich and E. Lederer, Helv. Chem. Acta, 35, 1148 (1952) and subsequent reaction of the acid with $SOCl_2$). 10.07 g. (0.049 mol) of d-pantothenol and 300 ml. of anhydrous chloroform, maintaining the temperature between 15 and 20° C. The mixture is then maintained overnight at room temperature with continuous stirring or refluxed for 6 hours. The solvent is removed by evaporation under reduced pressure and the residue dissolved in diethyl ether and water. The organic layer is separated from the water and washed with water, then with 5% aqueous hydrochloric acid, then with water again, then with 6% aqueous sodium carbonate and finally with water till neutral. The ethereal solution thus obtained is dried over anhydrous sodium sulphate. The ether is next evaporated under reduced pressure and the residue, after redissolving in petroleum ether, is purified by chromatography on 220 g. of alumina, eluating with petroleum ether. After evaporating off the solvent from the eluate, pure d-pantothenyl tri-farnesylacetate is obtained as a viscous practically colourless oil. $R_f=0.90$; $n_D^{25}=1.4975$.

*Analysis.*—Calcd. for $C_{60}H_{97}NO_7$ (percent): C, 76.30; H, 10.35; N, 1.48. Found (percent): C, 76.25; H, 10.40; N, 1.48.

The compounds listed in the following table are prepared by a method analogous to that described above:

| | Formula | $n_D^{25}$ | $R_f$* | Calculated, percent | | | Found, percent | | |
|---|---|---|---|---|---|---|---|---|---|
| | | | | C | H | N | C | H | N |
| d-Pantothenyl tri-geranate | $C_{39}H_{61}NO_7$ | 1.5071 | 0.77 | 71.41 | 9.37 | 2.13 | 71.29 | 9.45 | 2.09 |
| d-Pantothenyl tri-homogeranate | $C_{42}H_{67}NO_7$ | 1.4943 | 0.80 | 72.27 | 9.67 | 2.00 | 72.54 | 9.58 | 2.07 |
| d-Pantothenyl tri-geranylacetate | $C_{45}H_{73}NO_7$ | 1.4922 | 0.90 | 73.03 | 9.94 | 1.89 | 73.03 | 9.92 | 1.92 |
| d-Pantothenyl tri-farnesate | $C_{54}H_{85}NO_7$ | 1.5092 | 0.80 | 75.39 | 9.96 | 1.63 | 75.44 | 9.81 | 1.60 |
| d-Pantothenyl tri-homofarnesate | $C_{57}H_{91}NO_7$ | 1.5009 | 0.92 | 75.87 | 10.16 | 1.55 | 76.04 | 10.16 | 1.59 |
| d-Pantothenyl tri-citronellate | $C_{39}H_{67}NO_7$ | 1.4787 | 0.88 | 70.76 | 10.20 | 2.11 | 70.76 | 10.19 | 2.14 |

*The $R_f$ values have been determined on glass chromatostrips coated with Merck Silica Gel G (layer 500 μ), solvent benzene/acetone (8:1). The spots have been developed by spraying with a 1% solution of vanillin in concentrated sulphuric acid and heating at 100° C. for 15 minutes.

EXAMPLE 2

8.3 ml. (0.015 mol) of anhydrous pyridine are added during 30 minutes with vigorous stirring to a mixture of 5.88 g. (0.0315 mol) of α-cyclogeranoyl chloride, 3.08 g. (0.015 mol) of d-pantothenol and 40 ml. of anhydrous chloroform, maintaining the temeprature at 15–20° C. The mixture is then maintained overnight at room temperature with continuous stirring. The crude d-pantothenyl di-α-cyclogeranate is separated as described in Example 1. The product, re-dissolved in petroleum ether, is purified by chromatography on 70 g. of alumina. After removal of impurities by elution with petroleum ether/benzene (2:1), the pure d-pantothenyl-di-α-cyclogeranate is isolated by elution with benzene/acetone (8:2). The solvent is removed by evaporation leaving a viscous oil, $R_f=0.37$; $n_D^{25}=1.4991$.

*Analysis.*—Calcd. for $C_{29}H_{47}NO_6$: (percent): C, 68.87; H, 9.37; N, 2.77. Found (percent): C. 68.96; H, 9.36; N, 2.81.

The compounds listed in the following table are prepared by a method analogous to that described above:

| | Formula | $n_D^{25}$ | $R_f$* | Calculated, percent | | | Found, percent | | |
|---|---|---|---|---|---|---|---|---|---|
| | | | | C | H | N | C | H | N |
| d-Pantothenyl di-farnesate | $C_{39}H_{63}NO_6$ | 1.5089 | 0.48 | 72.97 | 9.89 | 2.18 | 72.85 | 9.91 | 2.17 |
| d-Pantothenyl di-homofarnesate | $C_{41}H_{67}NO_6$ | 1.5001 | 0.48 | 73.50 | 10.08 | 2.09 | 73.38 | 10.21 | 1.98 |
| d-Pantothenyl di-farnesylacetate | $C_{43}H_{71}NO_6$ | 1.4981 | 0.41 | 73.98 | 10.25 | 2.00 | 73.89 | 10.21 | 1.98 |

*The $R_f$ values were determined as with the compounds in the table relating to Example 1.

EXAMPLE 3

30 mls. anhydrous pyridine are added during 30 minutes with vigorous stirring to a mixture of 16.9 g. (0.033 mol) of farnesylacetic anhydride and 2.05 g. (0.01 mol) of d-pantothenol, the temperature being maintained between 15 and 20° C. The reaction is completed and the reaction mixture worked up as described in Example 1, pure d-pantothenyl tri-farnesylacetate being obtained.

EXAMPLE 4

Water-soluble ointments

Percent
(1) Pantothenyl tri-farnesylacetate _____ 0.25–5
  Polyethyleneglycol and preserving agent q.s. to 100%.
(2) Pantothenyl tri-farnesylacetate _____ 0.5–2
  Antibacterial agent _____ (¹)

ᵃ (Neomycin sulphate 0.5%; or Bacitracin 500 U./g.; or 2-N-pyrrolidino) ethyl α-(1-naphthyl) acrylate decabromide 0.1%; or mixtures thereof.)

Polyethylene glycol q.s. to 100%.

EXAMPLE 5

Liposoluble ointments

| | Percent |
|---|---|
| (1) Pantothenyl tri-farnesylacetate | 0.25–5 |
| Vaseline oil | 17 |
| White vaseline and preserving agent q.s. to 100%. | |
| (2) Pantothenyl tri-farnesylacetate | 0.25–5 |
| Antibacterial agent | (¹) |

¹(Neomycin sulphate 0.5%; or Bacitracin 500 U./g.; or 2-(N-pyrrolidino) ethyl α-(1-naphthyl) acrylate decabromide 0.05%; or mixtures thereof.)

| | |
|---|---|
| Vaseline oil | 17 |
| White vaseline q.s. to 100%. | |

EXAMPLE 6

Creams

| | Percent |
|---|---|
| (1) Pantothenyl tri-farnesylacetate | 0.25–5 |
| Cetylstearyl alcohol | 10 |
| Isopropyl myristate | 10 |
| Polyglycol ether of cetylstearyl alcohol | 10 |
| Demineralized water and preserving agent q.s. to 100%. | |
| (2) Pantothenyl tri-farnesylacetate | 0.25–5 |
| Antibacterial agent | (¹) |

¹ Neomycin sulphate 0.5%; or Bacitracin 500 U./g.; or Benzalconium hydrochloride 0.05%; or mixtures thereof.

| | |
|---|---|
| Cetylstearyl alcohol | 10 |
| Isopropyl myristate | 10 |
| Polglycolic ether of cetylstearyl alcohol | 5 |
| Demineralized water q.s. to 100%. | |

EXAMPLE 7

Lotions

| | Percent |
|---|---|
| (1) Pantothenyl tri-farnesylacetate | 0.25–5 |
| Wool fat alcohols | 2.50 |
| Lanoline ethoxilate derivatives | 1.00 |
| Cetyl alcohol | 0.50 |
| Sorbitan-sequioleate | 2.00 |
| Sorbitan-monostearate | 0.50 |
| Polyoxyethylene-sorbitan-monostearate | 0.50 |
| Water and preserving agent q.s. to 100%. | |
| (2) Pantothenyl tri-farnesylacetate | 0.25–5 |
| Antibacterial agent | (¹) |
| Wool fat alcohols | 2.50 |
| Lanoline ethoxilate derivatives | 1.00 |
| Cetyl alcohol | 0.50 |
| Sorbitan-sesquioleate | 2.00 |
| Sorbital-monostearate | 0.50 |
| Polyoxyethylene-sorbitan-monostearate | 0.50 |
| Demineralized water q.s. to 100%. | |

¹ Neomycin sulphate 0.5%; or Bacitracin 500 U./g.; or Benzalconium hydrochloride 0.05%; or mixtures thereof.

EXAMPLE 8

Oily eye-drops

| | Percent |
|---|---|
| (1) Pantothenyl tri-farnesylacetate | 0.25–5 |
| Oily polyoxyethylene glycerides | 10 |
| Peanut oil and preserving agent q.s. to 100%. | |
| (2) Pantothenyl tri-farnesylacetate | 0.25–5 |
| Antibacterial agent | (¹) |
| Oily polyoxyethylene glycerides | 10 |
| Peanut oil q.s. to 100%. | |

¹ Neomycin sulphate 0.5%; or Bacitracin 500 U./g.–1000 U./g.; or a mixture thereof.

EXAMPLE 9

Nasal drops

| | Percent |
|---|---|
| (1) Pantothenyl tri-farnesylacetate | 0.25–5 |
| Oily polyoxyethylene glycerides | 10 |
| Peanut oil and preserving agent q.s. to 100%. | |
| (2) Pantothenyl tri-farnesylacetate | 0.25–5 |
| Antibacterial agent | (¹) |
| Oily polyoxyethylene glycerides | 10 |
| Peanut oil q.s. to 100%. | |
| (3) Pantothenyl tri-farnesylacetate | 0.25–5 |
| Vasoconstrictor | (²) |
| Cetylstearyl alcohol | 2 |
| Isopropyl myristate | 2 |
| Polyglycol ether of cetylstearyl alcohol | 1 |
| Oily polyoxyethylene glycerides | 5 |
| Water and preserving agents q.s. to 100%. | |
| (4) Pantothenyl tri-farnesylacetate | 0.25–5 |
| Antibacterial agent | (⁴) |
| Cetylstearyl alcohols | 2 |
| Isopropyl myristate | 2 |
| Polyglycol ether of cetylstearyl alcohol | 1 |
| Oily polyoxyethylene glycerides | 5 |
| Demineralized water q.s. to 100%. | |
| Vasoconstrictor | (³) |

¹ Neomycin sulphate 0.5%; or Bacitracin 500 U./g.; or mixtures thereof.
² Nafazoline hydrochloride 0.05–0.1%; or Phenylephrine hydrochloride 0.25%.
³ Nafazoline hydrochloride 0.05–0.1%; or Phenylephrine hydrochloride 0.25%.
⁴ Neomycine sulphate 0.5%; or Bacitracin 500 U./g.; or a mixture thereof.

EXAMPLE 10

Tablets

| | G. |
|---|---|
| d-Pantothenyl tri-farnesylacetate | 0.050 |
| Colloidal silicic acid | 0.300 |
| Lactose | 0.050 |
| Stearic acid | 0.005 |
| Talc | 0.010 |
| Anti-oxidant agent | 0.001 |

EXAMPLE 11

Capsules

| | G. |
|---|---|
| d-Pantothenyl tri-farnesylacetate | 0.100 |
| Soya lecithin | 0.020 |
| Almond-oil | 0.080 |

Soft gelatine capsule.

EXAMPLE 12

Drops

| | G. |
|---|---|
| d-Panothenyl tri-farnesylacetate | 40 |
| Polyoxyethylene oleic glycerides | 60 |

EXAMPLE 13

Vials

| | G. |
|---|---|
| d-Pantothenyl tri-farnesylacetate | 0.050 |
| Peanut oil q.s. to 1 ml. | |

EXAMPLE 14

Suppositories

| | G. |
|---|---|
| d-Pantothenyl tri-farnesylacetate | 0.100 |
| Saturated fatty acid glycerides | 2.400 |

I claim:

1. A terpenic acid ester of d-pantothenol selected from the group consisting of d-pantothenyl tri-farnesylacetate and d-pantothenyl tri-geranylacetate.

2. The compound of claim 1 which is d-pantothenyl tri-farnesylacetate.

3. The compound of claim 1 which is d-pantothenyl tri-geranylacetate.

References Cited

UNITED STATES PATENTS

| | | | |
|---|---|---|---|
| 2,979,525 | 4/1961 | Feldert et al. | 424—319 |
| 3,092,548 | 6/1963 | Worton | 424—312 |
| 3,154,570 | 10/1964 | Adam et al. | 424—314 |
| 3,230,228 | 1/1966 | Erlemann et al. | 424—320 |
| 3,322,635 | 5/1967 | Erlemann et al. | 424—320 |

FOREIGN PATENTS

| | | | |
|---|---|---|---|
| 814,567 | 6/1959 | Great Britain | 424—320 |
| 906,000 | 9/1962 | Great Brtiain | 260—404 |
| 1,461,314 | 11/1966 | France | 260—404 |

OTHER REFERENCES

Casadio et al., "The Healing Properties, etc." (1967), CA 68, No. 114925 (1968).

Sakuragi et al., "The Biological Utilization of the Palmitic Acid Esters of Pantothenic Acid" (1956), CA 50, p. 17024 (1956).

Rosenberg, "Chem. and Physiology of the Vitamins" (1942), pp. 253–266.

Goodhart, "Modern Drug Encyclopedia," 9th ed. (May 1962), pp. 1517–18.

LEWIS GOTTS, Primary Examiner

G. HOLLRAH, Assistant Examiner

UNITED STATES PATENT OFFICE
CERTIFICATE OF CORRECTION

Patent No. 3,584,018　　　　　　　　　Dated　June 8, 1971

Inventor(s)　Silvano Casadio

It is certified that error appears in the above-identified patent and that said Letters Patent are hereby corrected as shown below:

Column 2, lines 20-21, "conerted" should read -- converted --.

Column 4, line 29, "0.015 mol" should read -- 0.105 mol --.

Column 4, line 74, "0.1%" should read -- 0.05% --.

Column 5, line 14, "0.05%" should read -- 0.1% --.

Column 5, line 35, "Polglycolic" should read -- Polyglycolic --

Signed and sealed this 7th day of March 1972.

(SEAL)
Attest:

EDWARD M. FLETCHER, JR.　　　　　　ROBERT GOTTSCHALK
Attesting Officer　　　　　　　　　　Commissioner of Patents